A. HYND.
HATCH FASTENER.
APPLICATION FILED NOV. 11, 1908.
975,528.
Patented Nov. 15, 1910.
2 SHEETS—SHEET 1.
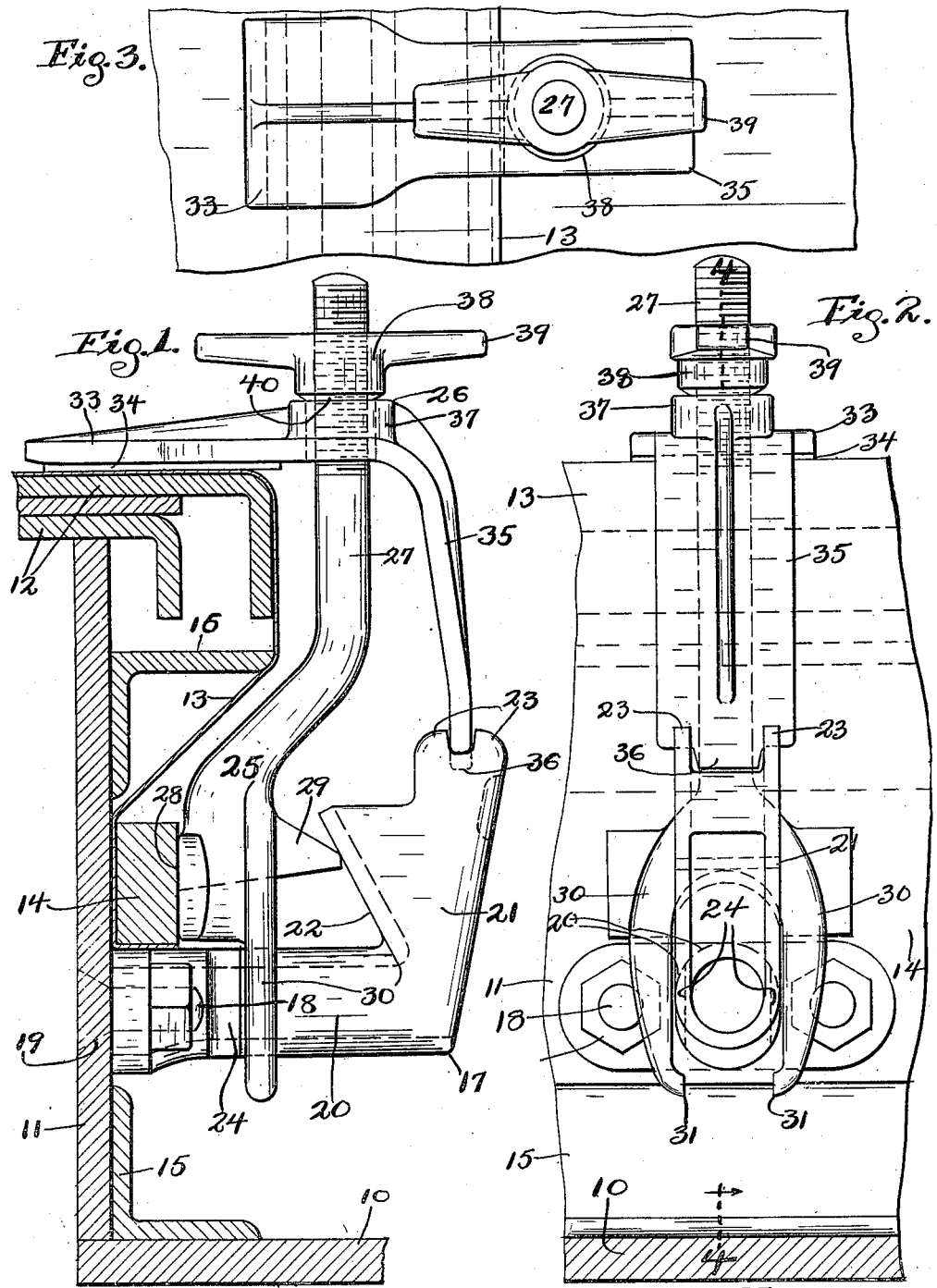
Witnesses:
Inventor:
Alexander Hynd
by Lynch & Dorr,
Attorneys

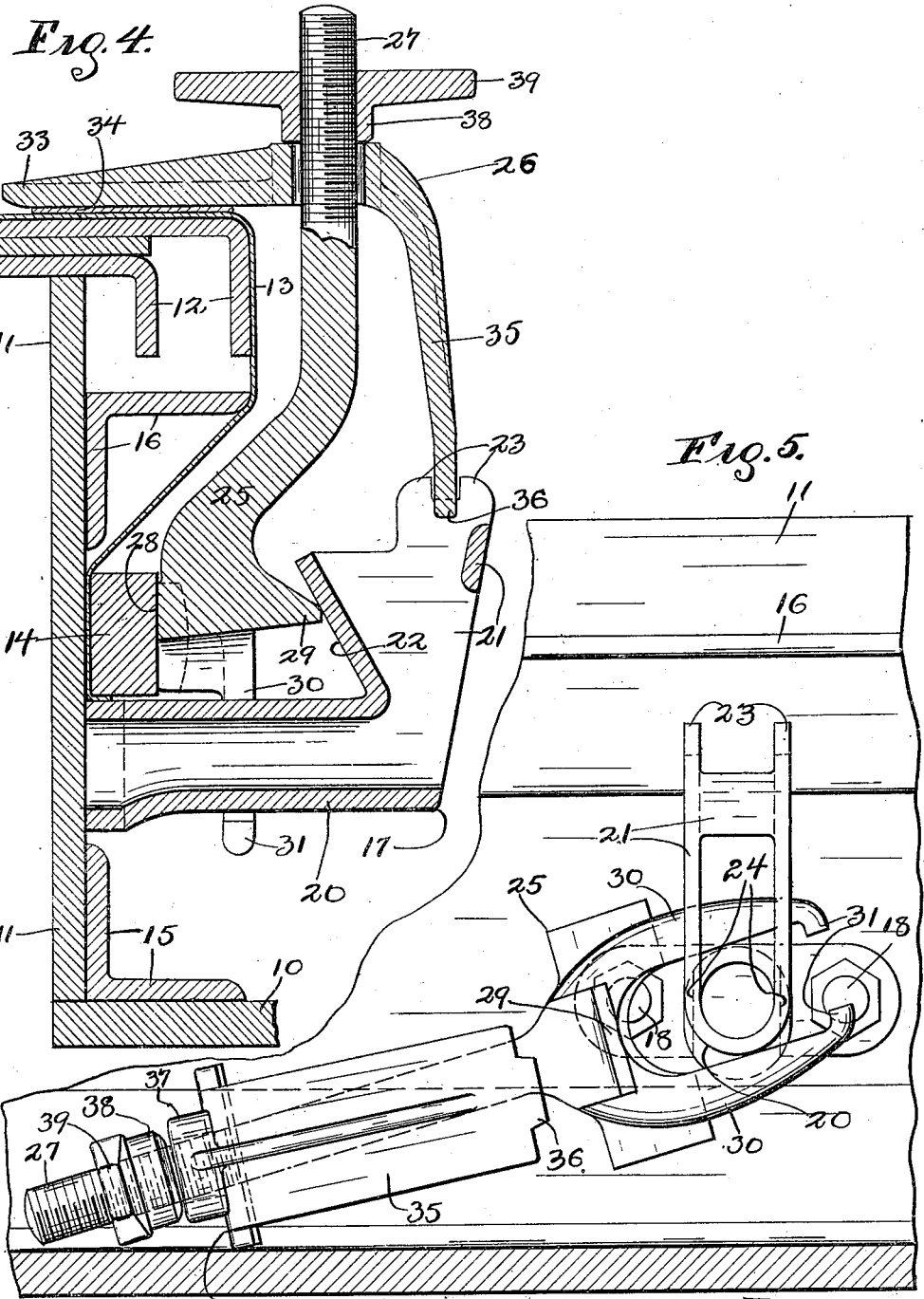

UNITED STATES PATENT OFFICE.

ALEXANDER HYND, OF CLEVELAND, OHIO.

HATCH-FASTENER.

975,528.  Specification of Letters Patent.  Patented Nov. 15, 1910.

Application filed November 11, 1908. Serial No. 462,113.

*To all whom it may concern:*

Be it known that I, ALEXANDER HYND, a citizen of the United States of America, residing at Cleveland, in the county of Cuyahoga and State of Ohio, have invented certain new and useful Improvements in Hatch-Fasteners; and I hereby declare the following to be a full, clear, and exact description of the invention, such as will enable others skilled in the art to which it pertains to make and use the same.

This invention relates to device for holding down hatch covers of vessels and for clamping to the hatch coamings the waterproof covers or tarpaulins so as to prevent water from entering a hatch between the coaming and the edges of the tarpaulin. Clamping devices have been employed heretofore for this purpose, but, as far as I am aware, none have proven entirely satisfactory, chiefly for the reason that, on account of differences in the thickness of the batten or wooden strips employed for clamping the edges of the tarpaulin against the coaming, the clamps do not hold both the hatch cover and the tarpaulin in place, but either clamp down the hatch cover without holding the edges of the tarpaulin firmly against the coaming, or hold the tarpaulin in place without clamping down the hatch cover.

The object of the present invention is to provide a clamping device which will hold the hatch cover firmly in place and securely clamp the tarpaulin against the coaming regardless of any differences in thickness of the hatch cover or batten.

In carrying out my invention I employ two clamping members, one for the hatch cover and the other for the tarpaulin, which members coöperate in a manner such that, when tightened preferably by a single tightening nut they have independent clamping action against the parts which they engage so that if one member engages first it does not prevent the tightening of the other clamping member.

More specifically considered, the clamping device comprises two clamping members and a bracket secured to the side of the coaming, the one, of said members, which clamps the tarpaulin to the coaming loosely engages the bracket and has a threaded shank which passes freely through the other member which is arranged to engage the hatch cover. The bracket is provided with an upwardly projecting portion which serves as a fulcrum for one of the members and has an inclined face which coöperates with the other member, so as to force the same laterally into clamping position, the parts being so arranged that when a nut on the threaded shank of one member is tightened against the other member, the latter is forced downward onto the hatch cover and the first member is drawn upward into engagement with the inclined face of the bracket and is thus shifted inwardly or laterally so as to tightly engage the batten.

My invention may be further briefly summarized as consisting in certain novel details of construction and combinations and arrangements of parts which will be described in the specification, pointed out in the claims and illustrated in the accompanying drawings.

In the accompanying drawings Figure 1 is a view showing in section a portion of deck, coaming, hatch cover and tarpaulin and showing in side elevation the parts of the clamping device. Fig. 2 is a front view of the same. Fig. 3 is a top plan view. Fig. 4 is a section on line 4—4, Fig. 2. Fig. 5 is a front elevation of the clamping device, showing it unclamped and lying down beside the coaming.

Referring to the drawings, 10 represents a portion of the deck, 11 the side of the coaming, 12 the hatch cover consisting in this case of a number of overlapping plates, 13 the tarpaulin which is spread over the hatch cover and extends along the sides of the coaming, and 14 a wooden strip or batten which is usually employed for clamping the edges of the tarpaulin to the coaming. In the angle formed by the coaming and deck is an angle iron 15, and extending around the coaming a short distance from the top is an angle iron 16 having a flange which extends outward as far as, or beyond, the outermost plates forming the hatch cover, and which is adapted to be engaged by the downwardly extending tarpaulin, so that the latter will extend downward to the batten evenly and uniformly.

Secured to the coaming a short distance above the angle iron 15 is a bracket 17 forming part of the clamping device, the bracket being secured to the coaming by short bolts 18 passing through the coaming wall and through perforated ears 19 on the bracket. The latter are provided with an outwardly extending shank 20 which is preferably cylindrical in shape and at the outer end of the shank with an upwardly extending portion 21 provided on the side toward the coaming with an inclined or cam face 22 adapted to coöperate with and form an abutment for one of the clamping members, and at the top with a pair of notched ears 23 which serve as a fulcrum for the other clamping member as will be explained.

At 25 and 26 are shown two clamping members, the former of which serves to clamp the tarpaulin to the coaming and the latter serves to hold down the hatch cover. The member 25 is provided with a shank 27 which is threaded at its upper end and passes freely through the member 26 and at the lower portion on one side with a clamping surface 28 adapted to engage the batten 14 and on the opposite side with a nose 29 adapted to engage the inclined face 22 of the bracket. The member 25 is also provided at the bottom with a pair of spaced arms 30 which extend loosely around the shank of the bracket, the ends of the arms extending inward toward each other as shown at 31 so that the clamping member cannot slip off the shank when not in use. The shank of the bracket 17 is provided on opposite sides with a pair of parallel grooves 24 which permit the arms 30 of the clamp member 25 to be slipped on or off at this point.

The clamping member 26 is substantially L-shaped having a portion 33 which is adapted to clamp down upon the top of the hatch cover, this portion being faced with leather or other yieldable material 34 to prevent abrasion of the tarpaulin, and with a downwardly extending portion 35 which when in clamping position rests upon the notched ears 23 of the bracket, the lower end of the member 26 which engages the ears being rounded so as to conform somewhat to the shape of the bottom of the notches of the ears so as to permit a freedom of movement, and having between the ears a downwardly extending lip 36 which prevents lateral movement of the clamping member when in position upon the bracket. The member 26 is also provided with a boss 37 having an opening through which the shank 27 of the clamping member 25 extends, the diameter of the opening being somewhat larger than the diameter of the shank. The end of the shank 27 is engaged by a nut 38 having hand-grips or projections 39 and a boss 40 adapted to engage the boss 37 on the member 26, the lower part of the boss 40 being slightly rounded as shown, to permit relative lateral movement between the same and the boss 37.

When it is desired to clamp the hatch cover and tarpaulin in place the lower end of the member 26 is placed within the notched ears 23 of the bracket and the nut 38 is tightened. By turning the nut 38 the shank 27 is drawn upward causing the projection or nose 29 to engage the inclined face 22 of the bracket 17 causing the member 25 to be shifted inward. At the same time the portion 33 of the clamping member 26 is forced downward onto the hatch cover. It will be seen that with this construction the two clamping members have clamping actions entirely independent of each other and the seating or clamping of one does not prevent the other from being tightened and both will be drawn firmly against the members which they are to engage regardless of the thickness or proportions of the hatch cover and batten.

While I have shown only a single clamping device it will be understood that as many of these clamping devices may be employed along each side of the hatch as is necessary or desired. When the hatch covers are made of overlapping sections as in the case illustrated I prefer to employ a clamp at each overlapping joint.

When it is desired to remove the hatch cover all that is necessary is to loosen the nut 38 an amount sufficient to permit the lower end of the clamping member 26 to be lifted out of the notches of the ears 23 of the bracket. When this is done the two clamping members can be turned down along the side of the coaming where they will be out of the way. At the same time however the members will not become separated from the shank of the bracket and be lost or misplaced.

I do not desire to be confined to the exact details shown, but aim in my claims to cover all modifications which do not involve a departure from the spirit and scope of my invention.

What I claim is,—

1. In a hatch cover and tarpaulin clamping device, a bracket, a pair of independently movable clamping members, said bracket having a fulcrum support for one of said members and an inclined face or abutment for the other, and means on one of said clamping members and engaging the other for forcing one of the same downward onto the hatch cover and the other in engagement with said inclined face and hence laterally toward the coaming.

2. In a device for clamping in position a hatch cover and tarpaulin, a bracket secured to the coaming, said bracket having a projection provided with an inclined face and a notched portion forming a seat, a pair of independently movable clamping members, one of said members being substantially L-shaped and adapted to engage the hatch cover and said seat, the other member having a threaded shank passing through an opening in the first member and having a nose or projection adapted to engage said inclined face on the bracket, and a nut on said shank serving to force said first member down upon the hatch cover and the second member upward into engagement with the inclined face and hence laterally so as to clamp the edge of the tarpaulin to the coaming.

In testimony whereof, I sign the foregoing specification, in the presence of two witnesses.

ALEXANDER HYND.

Witnesses:
  VICTOR C. LYNCH,
  N. L. McDONNELL.